United States Patent [19]

Kuwahara et al.

[11] Patent Number: 5,394,332
[45] Date of Patent: Feb. 28, 1995

[54] ON-BOARD NAVIGATION SYSTEM HAVING AUDIBLE TONE INDICATING REMAINING DISTANCE OR TIME IN A TRIP

[75] Inventors: Shingo Kuwahara; Morio Araki; Takeharu Arakawa, all of Kawagoe, Japan

[73] Assignee: Pioneer Electronic Corporation, Tokyo, Japan

[21] Appl. No.: 841,798

[22] Filed: Feb. 26, 1992

[30] Foreign Application Priority Data

Mar. 18, 1991 [JP] Japan .................................. 3-052545
Mar. 18, 1991 [JP] Japan .................................. 3-052546

[51] Int. Cl.$^6$ ............................................... G06G 7/78
[52] U.S. Cl. ................................... 364/449; 364/444; 364/443; 364/450; 340/988; 340/995; 342/396
[58] Field of Search .............. 364/449, 443, 444, 450, 364/457, 561, 446, 460, 569, 565; 340/988, 995, 990, 870.1; 342/396, 118, 127; 377/24.1, 17, 45, 52

[56] References Cited

U.S. PATENT DOCUMENTS

| | | | |
|---|---|---|---|
| 4,371,935 | 2/1983 | Yamaki | 364/561 |
| 4,371,940 | 2/1983 | Yamaki et al. | 364/444 |
| 4,943,925 | 7/1990 | Moroto et al. | 364/449 |
| 5,031,104 | 7/1991 | Ikeda et al. | 364/449 |
| 5,058,023 | 10/1991 | Kozikaro | 364/450 |
| 5,067,082 | 11/1991 | Nimura et al. | 364/449 |
| 5,119,301 | 6/1992 | Shimizu et al. | 364/450 |
| 5,157,614 | 10/1992 | Kashiwazaki et al. | 364/443 |
| 5,184,123 | 2/1993 | Bremer et al. | 340/995 |
| 5,184,303 | 2/1993 | Link | 364/449 |

Primary Examiner—Kevin J. Teska
Assistant Examiner—Jacques Harold Louis-Jacques
Attorney, Agent, or Firm—Sughrue, Mion, Zinn, Macpeak & Seas

[57] ABSTRACT

The present invention relates to an on-board navigation system which continuously informs a driver of the degree of approach of a vehicle to a destination by outputting a sound suited to the driver's actual running feeling.

10 Claims, 4 Drawing Sheets

5,394,332

ON-BOARD NAVIGATION SYSTEM HAVING AUDIBLE TONE INDICATING REMAINING DISTANCE OR TIME IN A TRIP

BACKGROUND OF THE INVENTION

1. Field of the Invention

The invention relates to an on-board (mounted in a vehicle) navigation system, and more particularly, to an on-board navigation system for informing to a user the degree of the vehicle's approach to a destination.

2. Description of Background Information

Nowadays, on board navigation systems are in practical use, in which map information is stored into memory and the map information is read out from memory and displayed on a display together with the current location of the vehicle, thereby guiding the vehicle to a predetermined destination.

In such an on-board navigation system, it is a relatively easy task to express a distance from the current location to a destination as a numerical value and to display the numerical value on a display, thereby informing to the user the degree of the vehicle's approach to the destination. However, the driver, who has to concentrate on driving and operation of the vehicle in response to changes in running condition, cannot look into the display a long time. As a result, there is a case where even when the distance between the current location and the destination is displayed, the degree of approach to the destination cannot be informed to the driver.

On the other hand, for the driver and passengers, during the vehicle is running when the degree of approach to the destination is informed by time, such an information is more easy to match the human sense rather than the case where it is informed by distance. In order to adequately inform such a degree of approach to the user, the above-mentioned display of the distance by the numerical value only is insufficient.

OBJECTS AND SUMMARY OF THE INVENTION

The invention has been made in view of the problems described above, and it is an object of the invention to provide an on-board navigation system which continuously inform the degree of the vehicle's approach to a destination to a driver executing the driving operations.

Another object of the invention is to provide an on-board navigation system which can inform the degree of approach to a destination continuously even to a driver who is executing driving operations and can adequately inform to the user the degree of the vehicle's approach to the destination in conformity with the user's perception of actual running state.

According to the first aspect of the invention, there is provided an on-board navigation system comprising: vehicle position information generating means for generating vehicle position information; destination setting means for setting position information of the destination; predictive running distance calculating means for calculating a predictive running distance from the current location to the destination on the basis of the vehicle position information and the position information of the destination; and information sound generating means for generating an information sound changing in accordance with the predictive running distance.

According to the first aspect of the invention, when the predictive running distance between the present location and the destination is smaller than a predetermined distance, the information sound is changed in accordance with the predictive running distance, thereby informing to the user the degree of approach to the destination.

According to the second aspect of the invention, there is provided an on-board navigation system comprising: vehicle speed acquiring means for acquiring a vehicle speed; vehicle position information generating means for generating vehicle position information; destination setting means for setting position information of a destination; predictive running distance calculating means for calculating a predictive running distance from the current location to the destination on the basis of the vehicle position and the position information of the destination; and predictive running time calculating means for calculating a predictive running time by the equation $$\left(\begin{array}{c}\text{predictive}\\ \text{running}\\ \text{time}\end{array}\right) = \frac{\text{(predictive running distance)}}{\text{(vehicle speed)}}$$

on the basis of the vehicle speed and the predictive running distance and information sound generating means for changing an information sound in accordance with the predictive running time.

According to the second aspect of the invention, when the predictive running time from the current location to the destination is smaller than a predetermined time, the information sound is changed in accordance with the predictive running time.

The above on-board navigation system changes the information sound in accordance with the predictive running distance from the current location to the destination and the running speed of the vehicle.

DETAILED DESCRIPTION OF A PREFERRED EMBODIMENT

Figure 1:
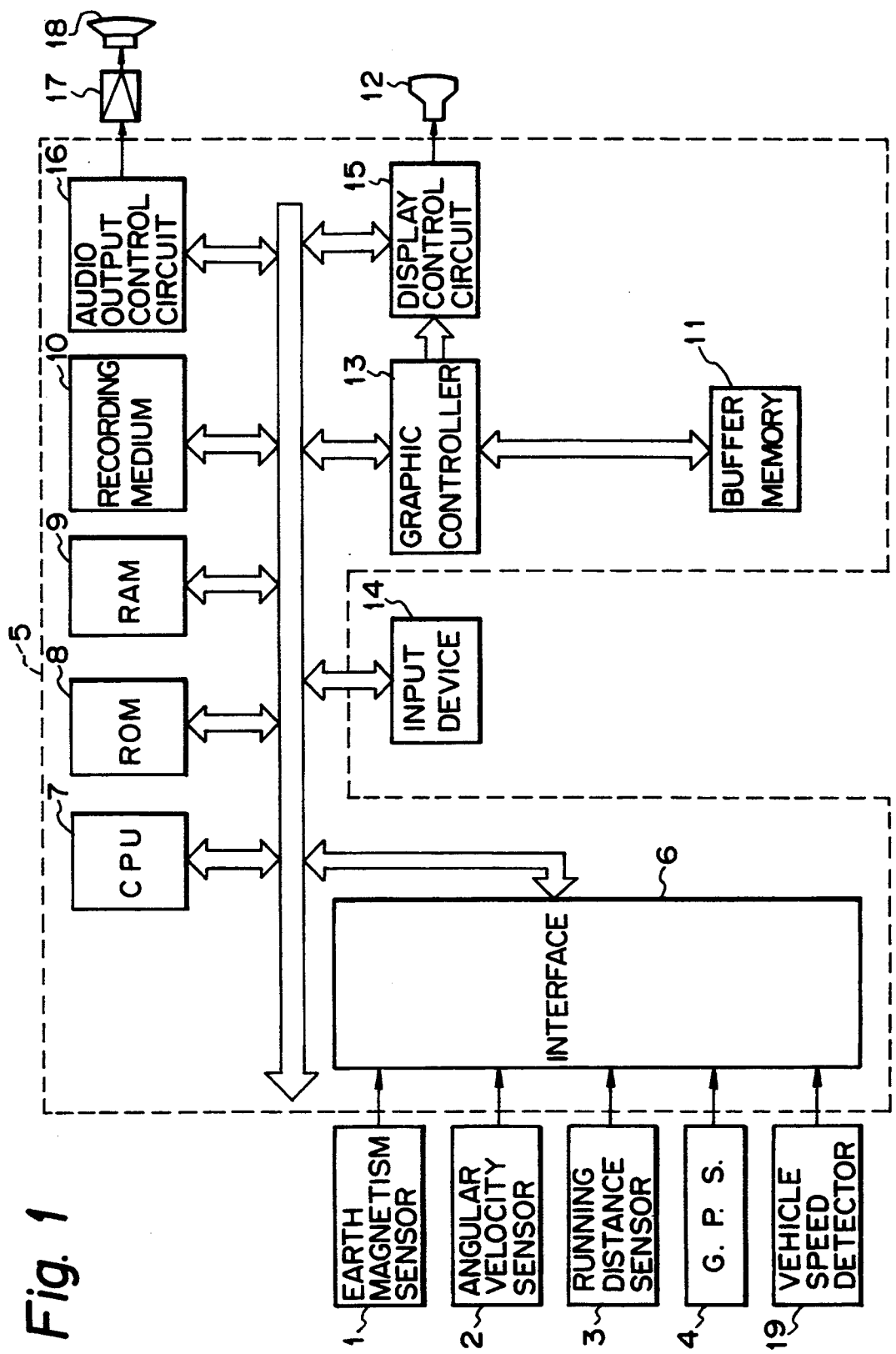
FIG. 1 is a block diagram showing a construction of an on-board navigation system to which the invention is applied.

FIG. 1 shows an example of an on-board navigation system to which the invention is applied. An embodiment will now be described in detail hereinafter with reference to FIG. 1.

In the FIG. 1, an earth magnetism sensor 1 is used to generate azimuth data of a vehicle on the basis of the earth magnetism (earth magnetic field). An angular velocity sensor 2 detects an angular velocity of the vehicle. A running distance sensor 3 detects the distance covered by the vehicle. A GPS (Global Positioning system) 4 detects the current location or the like of the vehicle from the longitude and latitude information or the like. A vehicle speed detector 19 detects a speed of the vehicle on the basis of the number of so-called vehicle speed pulses which are generated in proportion to, for instance, a rotational angle of a drive shaft of the vehicle. Outputs of the sensors (system, device) 1 to 4 and 19 are supplied to a system controller 5.

The system controller 5 comprises: an interface 6 for receiving the outputs of the sensors (system, and device) 1 to 4 and 19 and executes an A/D conversion and the like; a CPU (central processing unit) 7 for executing various kinds of image data processes and for calculating the amount of vehicle's movement, the vehicle position, the vehicle speed, and the like on the basis of the output data of the sensors (system, apparatus) 1 to 4 and 19 which are sequentially sent from the interface 6; a ROM (read only memory) 8 in which various kinds of processing programs of the CPU 7 and other necessary information have previously been stored; a RAM (random access memory) 9 into/from which information which is necessary to execute the programs is written and read out; a recording medium 10 which comprises what is called a CD-ROM, an IC card, or the like and in which digital map information has been recorded; a buffer memory 11 which comprises a V-RAM (video RAM) or the like and temporarily stores image information which can be immediately displayed as a frame buffer; a graphic controller for drawing data such as map or the like which is sent into the buffer memory 11 and for generating as image information in accordance with commands from the CPU 7; a display control circuit 15 to control a display 12 such as liquid crystal display apparatus, CRT, or the like in accordance with the image information which is generated from the graphic controller 13; and an audio output control circuit 16.

An input device 14 comprises a keyboard or the like and generates various kinds of commands to the system controller 5 by key inputs by the user. In the embodiment, the input device 14 is used for setting a destination and for designating generation/non-generation of an information sound, which will be explained later.

The audio output control circuit 16 controls various kinds of audio outputs including the information sound to inform the degree of vehicle's approach to the destination to the user. The audio output control circuit 16 discriminates an audio output command from the CPU 7 and responds to it and supplies a predetermined audio signal corresponding to such a command to an amplifier 17. The amplifier 17 amplifies the supplied audio signal to a speaker driving signal level and supplies to a speaker 18, thereby generating a sound therefrom.

Figure 2:
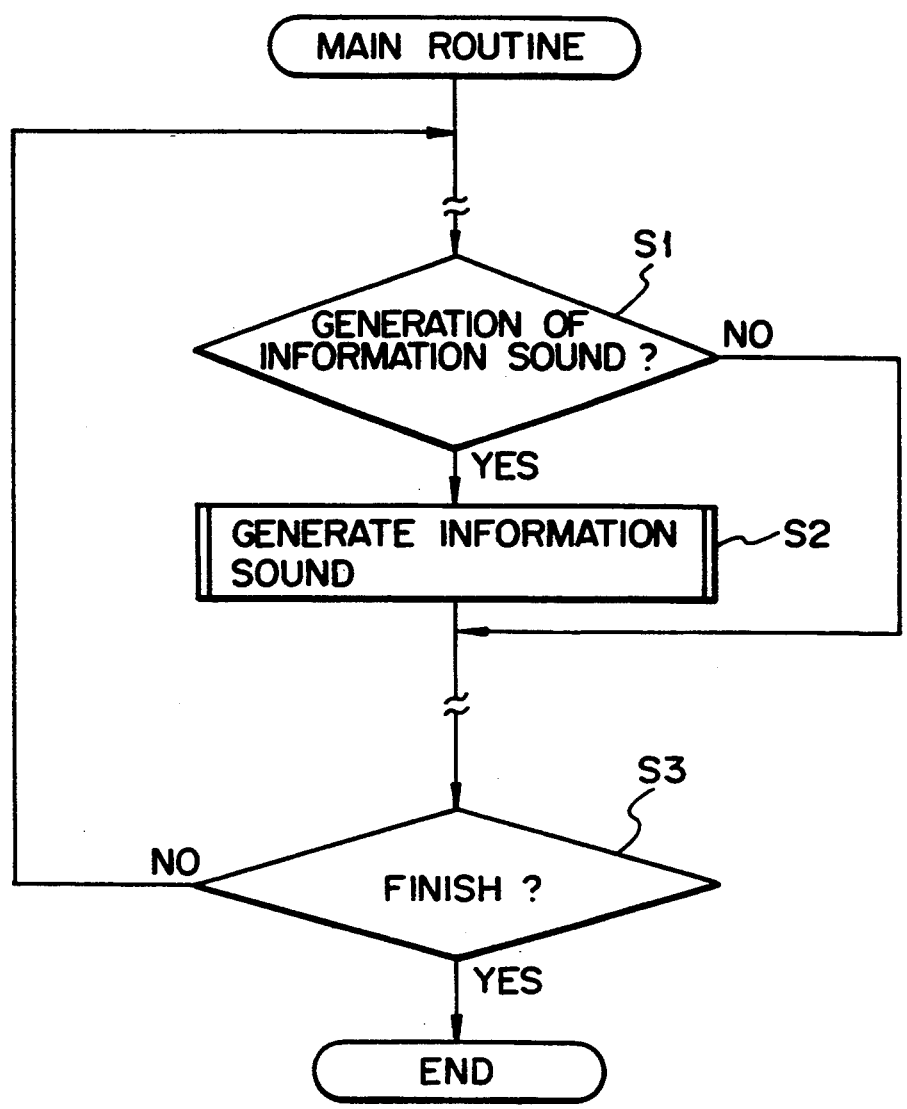
FIG. 2 is a flowchart for explaining a main routine to which the invention is applied.
Figure 3:
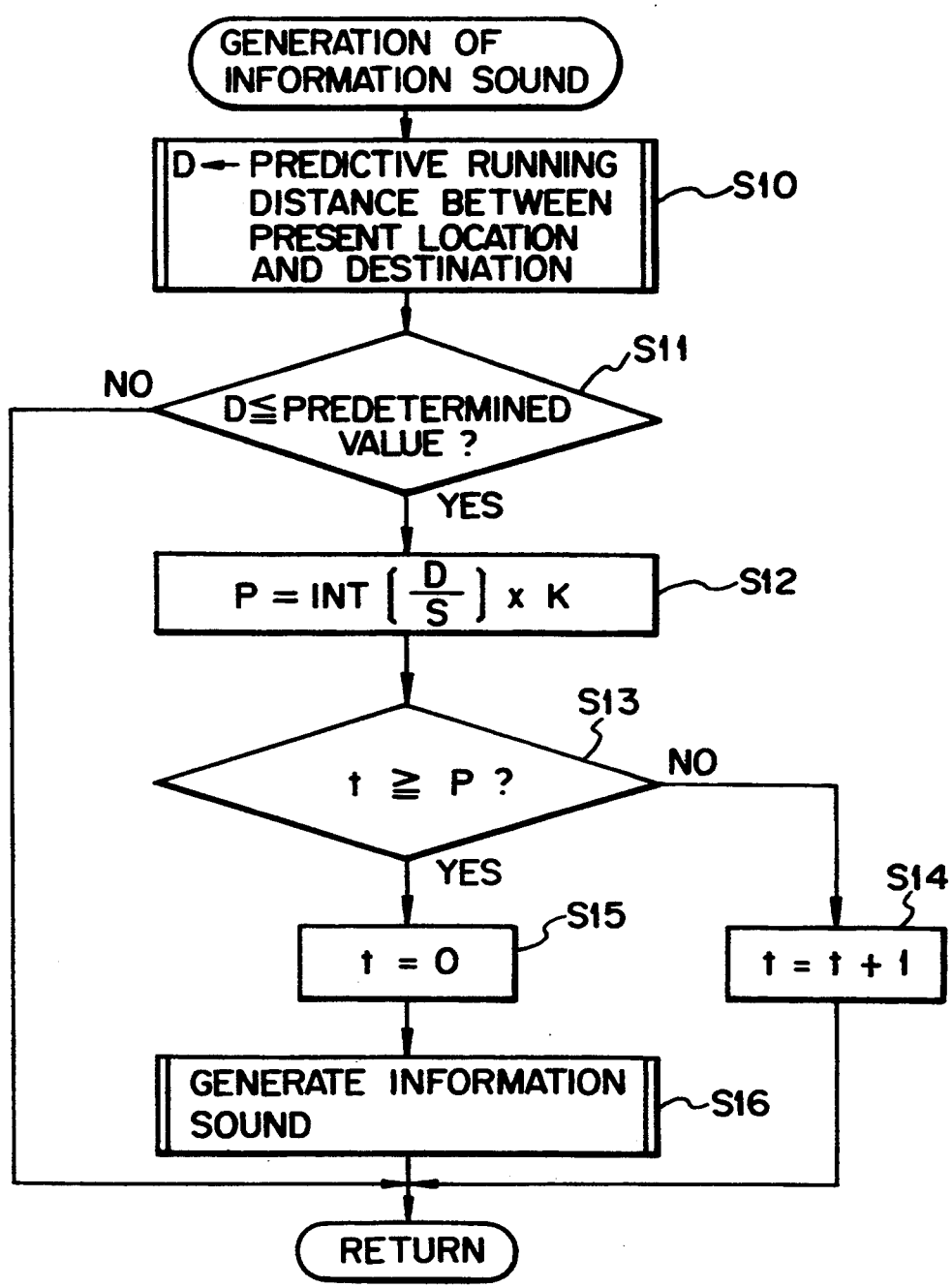
FIGS. 3 and 4 are flowcharts for explaining a information sound generation processing procedure of the embodiment according to the invention.
Figure 4:
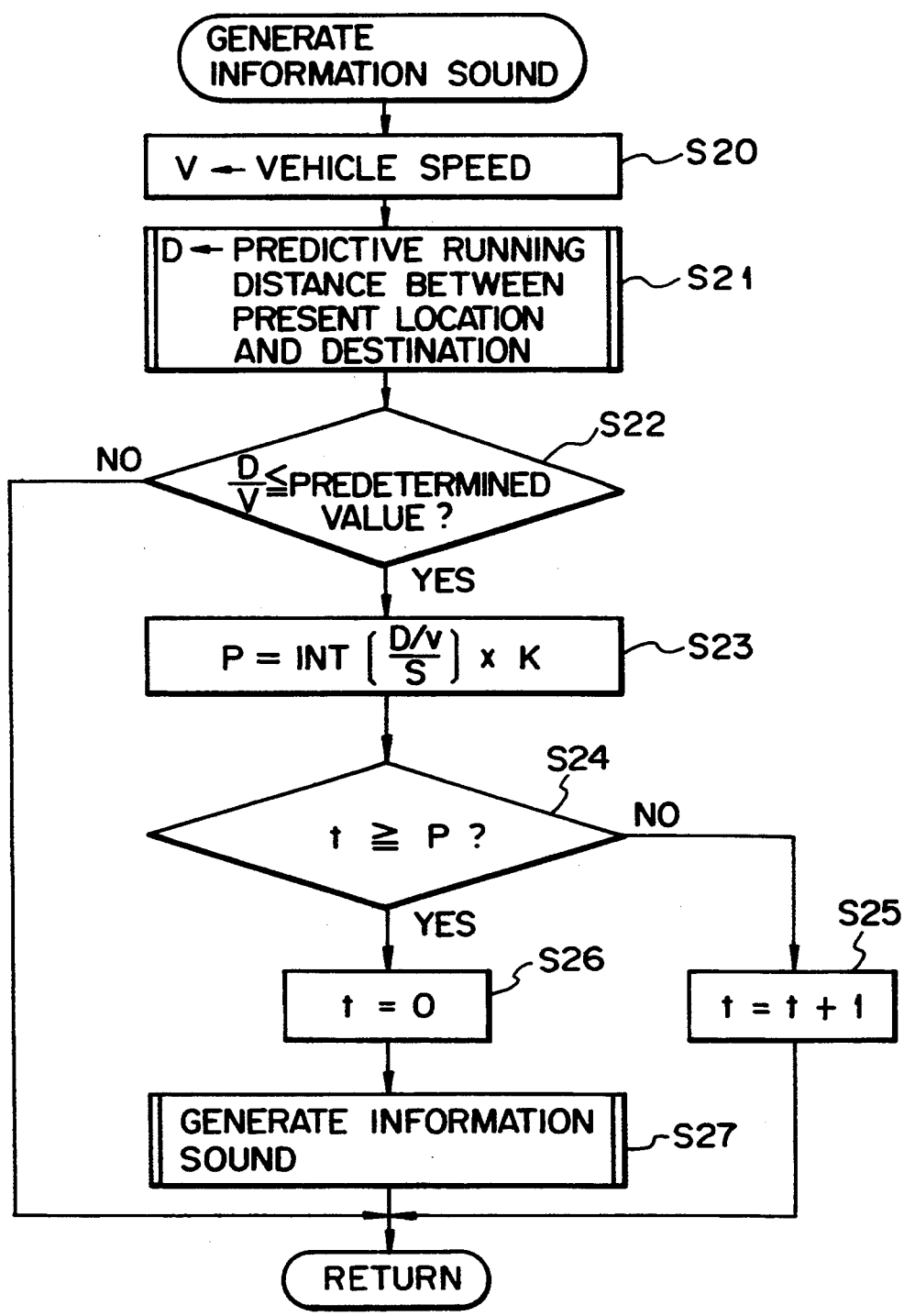

FIG. 2 is a flowchart for a main routine to which the embodiment according to the invention is applied. FIGS. 3 and 4 are flowcharts showing a information sound generation processing procedure which is executed by the CPU 7 in cooperation with the main routine. The embodiment will now be described hereinbelow with reference to FIGS. 2 to 4.

In FIG. 2, the execution of the main routine starts simultaneously with the turn-on of the system. After completion of various kinds of processing procedures, the processing routine advances to a selection flow for generation of the information sound (step S1). In step S1, a check is made to see if the information sound should be generated toward the user or not. The presence or absence of a information sound cut flag, a destination setting flag, and the like by, for instance, the key inputs by the user which have been acquired in the preceding steps (not shown) are checked. The information sound cut flag is a flag indicating whether the user or the system avoids the generation of the information sound or not. The destination setting flag is a flag indicating whether the system has acquired the destination of the vehicle or not. When it is confirmed that both of those flags have been set to "1", the program proceeds to step S2. When it is confirmed that either one of those flags is not set to "1", step S2 is skipped and the program goes to the subsequent step.

Step S2 is a processing routine for generation of the information sound as an embodiment of the invention and is shown as a subroutine. After completion of a series of processes, the processing routine is returned to the main routine. After completion of the execution of various kinds of subsequent processing procedures, for instance, the processing routine advances to a branch step such as step S3. In such a kind of branch step, a decision is made with respect to whether what is called the main routine is continued or not or the processing routine is returned to which step in the main routine. By repeating such a circulating flow, the processes in steps S1 and S2 are executed. In the circulating flow of the main routine, the processing routine is returned to step S1 at every almost predetermined time interval of about 100 milliseconds.

The information sound generation routine in the first embodiment of the invention will now be described with reference to FIG. 3. In the embodiment, the vehicle speed detector 19 shown in FIG. 1 can be omitted because it is not used.

In FIG. 3, when the processing routine advances from the main routine to the information sound generation routine, the CPU 7 first acquires a straight line distance D between the current location and the destination by longitude and latitude data of the vehicle position, namely, the current location and longitude and latitude data of the destination which have already been acquired (step S10). As the simplest method, the straight line distance between the current location and the destination has been acquired. The invention, however, is not limited to such a method but it is more preferable to acquire a distance which is close to the actual running distance based on the running path along which the vehicle will run toward the destination from that instant. Diverse predictive running distances can be used for this purpose.

A check is now made to see whether or not the predictive running distance D is equal to or less than a predetermined value (step S11). The predetermined value is set to judge whether or not the vehicle has approached the destination. When it is determined that the predictive running distance D exceeds the predetermined value, indicating that the vehicle has not approached to the destination yet, the above subroutine is finished and the processing routine advances to the main routine.

As the predictive running distance D until the destination decreases in association with the run of the vehicle, the processing routine again advances to the above subroutine and steps S10 and S11 are executed. When the predictive running distance D is equal to or less than the predetermined value, the CPU 7 calculates a control variable P (step S12) which is used for the subsequent processes in order to properly generate a information sound as shown in the following equation (1).

$$P = INT[D/S] \cdot K \quad (1)$$

where, INT denotes a process to round the value in [ ] to an integer. S denotes a variable which is used in the case where the control variable P is changed step by step in accordance with a change in D without changing P completely in proportion to the predictive running distance D. K is a coefficient indicative of the shortest time of the information sound generation interval which is determined by the processing time which is required for the above circulating flow or the like.

The control variable P which has been rounded to an integer is compared with a count value t of an internal counter to determine the output timing of the information sound (step S13). When the count value t is smaller than the control variable P, the count value t of the internal counter is incremented by "1" (step S14). The above subroutine is finished and the program proceeds to the main routine.

On the other hand, when the count value t is equal to or larger than the control variable P, the count value t of the internal counter is cleared (step S15). The CPU supplies an audio output command to generate the information sound to the audio output control circuit 16, thereby allowing a predetermined information sound to be generated from the speaker 18 (step S16). After the generation of the information sound, the subroutine is finished and the main routine follows.

After that, in the main routine, the above subroutine is repetitively executed every predetermined time by the circulating flow as mentioned above. The information sound is generated until the generation of the information sound is stopped in step S1.

In the subroutine, in the processing flow in step S13 and subsequent steps, the audio output control circuit 16 controls the generation of a predetermined information sound which is supplied to the amplifier 17 and the count value t is used to form the information sound generation timing according to a magnitude of the control variable P which is proportional to the predictive running distance D. That is, intermittent sounds are produced as a information sound. An intermittent interval of the intermittent sounds is determined in the flow via step S14. Even when it is determined in step S11 that the predictive running distance D is equal to or less than the predetermined value and the information sound is subsequently generated, therefore, the count value t is cleared together with one audio output by the flow via step S15. After that, the internal counter counts the time interval which is determined by the magnitude of the control variable P which always varies, as shown in step S14. After the count value t reaches the control variable P and the intermittent interval is counted, the next audio output is generated. The value of the control variable P, therefore, decreases as the vehicle approaches the destination, and the audio output changes to a state in which the intermittent interval is shorter. For instance, in the case where the vehicle runs in such a direction as to be away from the destination opposite to the direction of the destination, since the predictive running distance D and control variable P increase, the generation of the information sound can be stopped in step S11 or the intermittent interval of the intermittent sounds can be increased in step S13.

Although the embodiment has been described on the assumption that the intermittent sounds are used as a information sound and the intermittent interval of the intermittent sounds is determined by using the count value t of the internal counter and the information sound is changed, the invention is not limited to the above example. It is sufficient that the information sound can be changed in accordance with the predictive running distance up to the destination. For instance, the tone of the information sound or the output sound pressure level can be also changed.

The second embodiment of the invention will now be described with reference to FIG. 4.

In FIG. 4, when the processing routine advances from the main routine to the information sound generation routine, the CPU 7 first fetches a vehicle speed v (step S20) and acquires the straight line distance D between the current location and the destination (step S21) by the longitude and latitude data of the vehicle position, namely, the current location and the longitude and latitude data of the destination which have already been acquired. Although the straight line distance between the current location and the destination has been acquired here as the simplest method, the invention is not limited to the above method. It is more preferable to use a distance which is close to the actual running distance based on the running path along which the vehicle will run toward the destination from that instant. A predictive running distance can be used for this purpose. The value in which the predictive running distance D is divided by the vehicle speed v, that is, the predictive running time from the current location to the destination is compared with a predetermined value, thereby discriminating whether the predictive running time $D/v$ is equal to or less than the predetermined value or not (step S22). The above predetermined value is used to judge whether the vehicle has approached the destination or not. When the predictive running time $D/v$ exceeds the predetermined value, namely, when it is decided that the vehicle doesn't approach the destination yet with respect to the time, the above subroutine is finished and the main routine follows.

As the predictive running time $D/v$ until the destination decreases in association with the run of the vehicle, the processing routine again advances to the above subroutine and steps S20, S21, and S22 are executed. When the predictive running time $D/v$ is equal to or less than the predetermined value, the CPU 7 calculates the control variable p which is used for the subsequent processes (step S23) in order to properly generate a information sound as shown in the following equation (2).

$$P = INT[(D/v)/S] \cdot K \qquad (2)$$

where, INT denotes a process to round the value in [ ] to an integer. S denotes a variable which is used in the case of changing the control variable P step by step in accordance with a change in value of $D/v$ without perfectly changing the control variable P in proportion to the predictive running time $D/v$. K denotes the coefficient indicative of the shortest time of the information sound generation interval which is determined by the processing time which is required for the above circulating flow or the like.

In a manner similar to the first embodiment, the control variable P which has been rounded to an integer is compared with the count value t of the internal counter to determine the generation timing of the information sound (step S24). When the count value t is smaller than the control variable P, the count value t of the internal counter is increased by "1" (step S25). The above subroutine is finished and the program goes to the main routine.

When the count value t is equal to or larger than the control variable P, on the other hand, the count value t of the internal counter is cleared (step S26). The acoustic generation command to generate the information sound is supplied to the audio output control circuit 16, thereby generating a predetermined information sound from the speaker 16 (step S27). After generation of the information sound, the subroutine is finished and the main routine follows.

After that, in the main routine, the above subroutine is repetitively executed every predetermined time by the circulating flow as mentioned above. The information sound is generated until the generation of the information sound is stopped in step S1.

In the subroutine, the flow in step S24 and subsequent steps is performed to control the generation of the predetermined information sound which is supplied from the audio output control circuit 16 to the amplifier 17. The count value t is used to produce the information sound generation timing according to the magnitude of the control variable P which is proportional to the predictive running time D/v. That is, intermittent sounds are produced as an information sound. The intermittent interval of the intermittent sounds is determined in the flow via step S25. Even when it is determined in step S22 that the predictive running time D/v is equal to or less than the predetermined value and the information sound is generated after that, after the count value t was cleared together with one audio output by the flow via step S26, the internal counter counts the time interval which is decided by the magnitude of the control variable P which always fluctuates as shown in step S24. After the count value t reaches the control variable P and the intermittent interval is counted, the next audio output is executed. The value of the control variable P, therefore, decreases as the vehicle approaches the destination, so that the audio output changes to the audio output in which the intermittent interval is short. On the other hand, for instance, in the case where the vehicle contrarily runs in such a direction as to be away from the destination opposite to the direction approaching the destination, the predictive running distance D and the control variable P increase. Thus, the generation of the information sound can be stopped in step S22 or the intermittent interval of the intermittent sounds can be increased in step S24.

In the embodiment, the information sound is changed by not only the predictive running distance D but also the vehicle speed v. Even when the remaining predictive running distance D up to the destination is very small, so long as the vehicle speed v is relatively slow, the predictive running time D/v is larger than the predetermined value in the process as in step S22 or the control variable P is set to a large value in step S23, so that the generation of the information sound can be avoided or the intermittent interval of the intermittent sounds can be increased. Similarly, for instance, since the vehicle speed v in the stop state of the vehicle is equal to zero, the predictive running time D/v has a value near the infinite in step S22. In such a stop state of the vehicle, therefore, the generation of the information sound as in step S27 is avoided and the subroutine is finished.

Although the embodiment has been described also on the assumption that the intermittent sounds are used as a information sound and the intermittent interval of the intermittent sounds is decided by using the count value of the internal counter and the information sound is changed, the invention is not limited to such a method. It is sufficient to change the information sound in accordance with the predictive running distance up to the destination. For instance, it is obviously possible to change the tone of the information sound or the output sound pressure level.

According to the invention as described above, when the predictive running distance or predictive running time from the current location to the destination is equal to or less than the predetermined value, the information sound is changed in accordance with the predictive running time. Even to the driver executing the driving operation, therefore, the degree of approach to the destination can be continuously informed and it is possible to make the user recognize the degree of approach to the destination by sound. In the case of monotonous running, for instance, in the running to the destination on a one-way road, the driver pays attention to only a change in information sound and is guided to the destination without need to see the map. Thus, there is an advantage such that the driver can run the vehicle without anxiety, so that the system of the invention can be used as a kind of sound navigation. According to the invention, the information sound is changed not only by the predictive running distance from the current location to the destination but also the vehicle speed, so that a good information sound which is suited to the actual running feeling of the passenger can be generated. Particularly, in the stand still state of the vehicle such as signal waiting state during the running, an unnecessary information sound can be avoided so that the vehicle cabin can be kept silent, thereby making the use of the system quite convenient.

What is claimed is:

1. An on-board navigation system comprising:
vehicle position information generating means for generating vehicle position information;
destination setting means for setting position information of a destination;
predictive running distance calculating means for calculating a predictive running distance from a current location to said destination on the basis of said vehicle position information and said position information of said destination; and
information sound generating means for generating an information sound which changes in accordance with said predictive running distance, when said calculated predictive running distance becomes lower than a predetermined value.

2. A navigation system according to claim 1, wherein said information sound generating means produces an intermittent sound as the information sound and changes an interval of said intermittent sound in accordance with said predictive running distance.

3. A navigation system according to claim 1, wherein said predictive running distance calculating means calculates a straight line distance from said current location to said destination and sets said straight line distance as said predictive running distance.

4. A navigation system according to claim 1, wherein said information sound generating means produces a sound of a specific tone and changes the tone of the produced sound in accordance with said predictive running distance.

5. A navigation system according to claim 1, wherein said information sound generating means produces a sound of a specific loudness and changes the loudness of the produced sound in accordance with said predictive running distance.

6. An on-board navigation system comprising:

vehicle speed acquiring means for acquiring a vehicle speed;

vehicle position information generating means for generating vehicle position information;

destination setting means for setting position information of a destination;

predictive running distance calculating means for calculating a predictive running distance from a current location to the destination on the basis of said vehicle position information and said position information of said destination;

predictive running time calculating means for calculating a predictive running time by the following equation $$\left(\begin{array}{c}\text{predictive}\\ \text{running}\\ \text{time}\end{array}\right) = \frac{\text{(predictive running distance)}}{\text{(vehicle speed)}}$$

on the basis of said vehicle speed and said predictive running distance; and information sound generating means for generating an information sound which changes in accordance with said predictive running time, when said predictive running time becomes lower than a predetermined value.

7. A navigation system according to claim 6, wherein said information sound generating means produces intermittent sound as the information sound and changes an interval of said intermittent sound in accordance with said predictive running time.

8. A navigation system according to claim 6, wherein said predictive running distance calculating means calculates a straight line distance from the current location to the destination and sets the straight line distance as said predictive running distance.

9. A navigation system according to claim 6, wherein said information sound generating means produces a sound of a specific tone and changes the tone of the produced sound in accordance with said predictive running time.

10. A navigation system according to claim 6, wherein said information sound generating means produces a sound of a specific loudness and changes the loudness of the produced sound in accordance with said predictive running time.

* * * * *